G. B. FRANKFORTER.
PRESSURE INDICATOR FOR INTERNAL COMBUSTION ENGINES.
APPLICATION FILED SEPT. 2, 1919.
1,424,461. Patented Aug. 1, 1922.
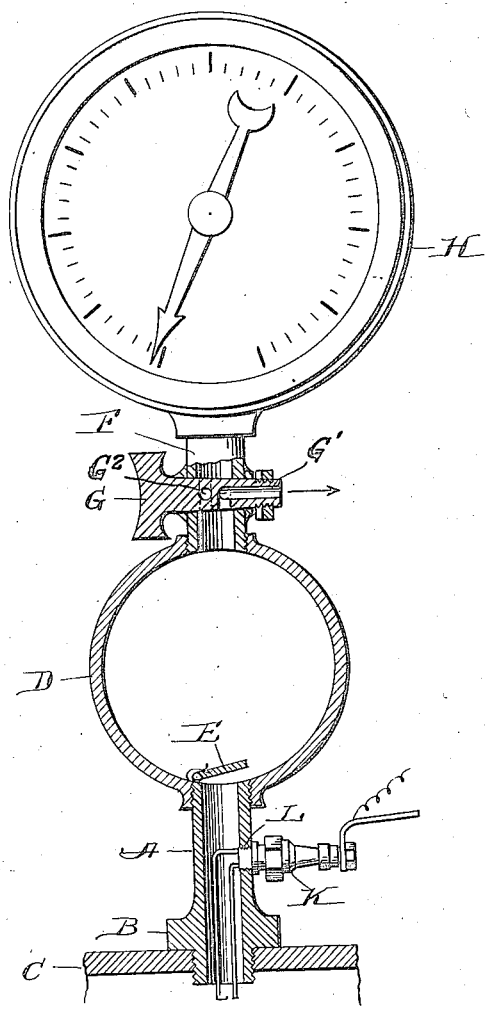
INVENTOR
George B. Frankforter

UNITED STATES PATENT OFFICE.

GEORGE B. FRANKFORTER, OF THE UNITED STATES ARMY.

PRESSURE INDICATOR FOR INTERNAL-COMBUSTION ENGINES.

1,424,461. Specification of Letters Patent. Patented Aug. 1, 1922.

Application filed September 2, 1919. Serial No. 321,228.

(FILED UNDER THE ACT OF MARCH 3, 1883, 22 STAT. L., 625.)

*To all whom it may concern:*

Be it known that I, GEORGE B. FRANKFORTER, major, Ordnance Department, United States Army, a citizen of the United States, stationed at Washington, District of Columbia, have invented an Improvement in Pressure Indicators for Internal-Combustion Engines, of which the following is a specification.

The invention described herein may be used by the Government, or any of its officers or employees in prosecution of work for the Government, or by any other person in the United States, without payment of any royalty thereon.

This invention relates to an attachment for use in connection with internal combustion engines, and more particularly to a form of instrument which may be used for indicating the proper adjustment of the carburetor of an internal combustion engine, and for testing the efficiency and power of such engine.

Internal combustion engines are commonly adjusted for efficiency by the repairer or the expert through regulation of the carburetor, adjustment of the timing, etc., so that the maximum power is obtained. This method of adjustment, however, depends entirely upon individual judgment and experience and is, therefore, neither certain nor definite.

My invention gives an accurate and scientific means for determining both the compression and explosion pressure in pounds per square inch, thus enabling an adjustment which will give highest efficiency.

By means of my invention, the location of any trouble may be readily accomplished by the indication of the cylinder which is faulty or by indicating that the explosive mixture or ignition is defective, thus enabling even an inexperienced operator to locate the source of difficulty.

My invention is also inexpensive and simple in construction and accurate in operation.

With the above objects in view, reference is made to the accompanying drawing in which is represented a partial sectional view of the preferred embodiment of my invention, the valve shown in position to place the reservoir in communication with the atmosphere, the reverse position of the valve ports indicated in dotted lines.

A represents a tubular connection having threaded ends, a shoulder or flange B, an intermediate threaded hole L. One end of the tubular connection A is screwed into the cylinder head C of the engine, until the shoulder B abuts tightly against the same. A gasket (not shown) may be used between the shoulder B and cylinder head C in case the threaded connection is not gas tight.

To the opposite end of the tubular connection is threaded the reservoir D of a capacity having a fixed ratio to the capacity of the engine cylinder, but in the ordinary automobile engine, a reservoir of approximately 50 cubic centimeters capacity is used. This end of tubular connection A is opened and closed by means of a light spring pressed check valve E which serves to open and close the connection between the reservoir D and engine cylinder C, depending upon the pressures existing in each.

The upper part of the reservoir D is bored and threaded for the reception of one end of tubular connection F, the other end of this connection being attached by any suitable means to the pressure gage H. Inserted in the connection F between the reservoir and pressure gage is a three-way valve G adapted to close the connection between the reservoir and gage or open this connection or connect the gauge and the reservoir to the atmosphere.

In the position of the valve shown in the figure the reservoir is in communication through the port $G'$ with the atmosphere. When the valve is set at right angles to the position shown the passage to the atmosphere is cut off and communication between the reservoir and gauge is established through the port $G^2$ as indicated in dotted lines in the figure.

Inserted in the threaded hole L of connection A is a spark plug K connected in the usual manner to the ignition system of the engine.

In operation the attachment as above described is threaded into the engine cylinder to be tested, in place of the ordinary spark plug and in the case of multi-cylinder engines, the spark plug K is at first not connected to the ignition system, but the engine is started and allowed to run for a few minutes with the remaining cylinders active. During the compression stroke of the piston in the cylinder C, the gas will be compressed in the reservoir D, the check valve E lifting until the pressure in reservoir D equals the compression of the engine. After the motor has been running for a few moments, until the equality of pressure mentioned above has taken place, the valve G is opened to allow communication between the reservoir and the gage H. The gage will then indicate the pressure in the reservoir D which will be the maximum pressure attained in the engine cylinder.

After a satisfactory reading has been taken, the reservoir D is opened to the atmosphere by means of the valve G and the explosive mixture is allowed to escape. The attachment can now be applied, in like manner, successively, to the other cylinders of the engine.

If it is desired to indicate the explosion pressure, the spark plug K is connected to the ignition system of the engine after the attachment has been applied in the usual manner, the valve G being closed. The explosion pressure will now pass from the engine cylinder C to the reservoir D through check valve E until such time as the reservoir pressure and explosion pressure are equal, in which case the valve E will remain closed. This occurs after the engine has been run for a few moments and the valve G is then turned so as to open communication between the reservoir and gage H. The gage will then indicate the pressure within the reservoir D which will be the maximum explosion pressure attained in the engine cylinder.

Having described my invention, what I claim as new and desire to secure by Letters Patent, is:—

A pressure indicator for internal combustion engines, including a tubular connection formed at one end for threaded engagement with the head of the engine cylinder, the interior diameter of the connection being sufficient to allow free passage of fluid therethrough, a spark plug carried by the connection, a reservoir secured to the upper end of the connection, a check valve controlling the communication between the tubular connection and reservoir, a gauge connected to the reservoir and a three-way valve controlling communication between the reservoir and gauge, whereby the communication is established between the reservoir and gauge when the valve is in one position and between the reservoir and the atmosphere when the valve is turned to a position at right angles to the first mentioned position.

GEORGE B. FRANKFORTER.